US006804995B2

(12) United States Patent
Kawano

(10) Patent No.: US 6,804,995 B2

(45) Date of Patent: Oct. 19, 2004

(54) FUEL VAPOR TREATMENT SYSTEM WITH FAILURE DIAGNOSIS APPARATUS

(75) Inventor: Akihiro Kawano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 48 days.

(21) Appl. No.: 10/186,746

(22) Filed: Jul. 2, 2002

(65) Prior Publication Data

US 2003/0015179 A1 Jan. 23, 2003

(30) Foreign Application Priority Data

Jul. 19, 2001 (JP) ....................................... 2001-219000

(51) Int. Cl.[7] ............................................. G01M 15/00

(52) U.S. Cl. ..................................................... 73/118.1

(58) Field of Search ................................ 73/116, 117.2, 73/117.3, 118.1, 119 A; 340/438, 439; 701/29

(56) References Cited

U.S. PATENT DOCUMENTS

| | | | | |
|---|---|---|---|---|
| 5,408,866 A | * | 4/1995 | Kawamura et al. | 73/40 |
| 5,448,980 A | * | 9/1995 | Kawamura et al. | 123/520 |
| 5,690,086 A | * | 11/1997 | Kawano et al. | 123/674 |
| 5,767,395 A | | 6/1998 | Goto et al. | |
| 5,845,625 A | | 12/1998 | Kidokoro et al. | |
| 5,911,209 A | * | 6/1999 | Kouda et al. | 123/520 |
| 6,016,792 A | * | 1/2000 | Kawano et al. | 123/520 |
| 6,220,229 B1 | * | 4/2001 | Kawamura et al. | 123/520 |
| 6,220,230 B1 | * | 4/2001 | Kawamura et al. | 123/520 |
| 6,227,037 B1 | | 5/2001 | Kawamura et al. | |
| 6,257,050 B1 | * | 7/2001 | Nagano et al. | 73/47 |
| 6,276,343 B1 | * | 8/2001 | Kawamura et al. | 123/520 |
| 2003/0019481 A1 | * | 1/2003 | Kawano | 123/520 |
| 2003/0019482 A1 | * | 1/2003 | Kawano | 123/520 |
| 2003/0029226 A1 | * | 2/2003 | Kawano | 73/40.5 R |

FOREIGN PATENT DOCUMENTS

| | | |
|---|---|---|
| JP | 7-317611 A | 12/1995 |
| JP | 10-37813 A | 12/1998 |
| JP | 2000-282970 A | 4/2001 |

* cited by examiner

*Primary Examiner*—Eric S. McCall
(74) *Attorney, Agent, or Firm*—Shinjyu Global IP Counselors, LLP

(57) ABSTRACT

A leak diagnosis control device is provided in a fuel vapor treatment system that uses one sensor to detect both the atmospheric pressure and the pressure inside the fuel vapor treatment system. The leak diagnosis control device closes off the fuel vapor treatment system between a fuel tank and a purge valve, and conducts leak analysis of the fuel vapor treatment system. An absolute pressure sensor is provided to measure the atmospheric pressure as well as the pressure inside the fuel vapor treatment system. When conditions are satisfied, the leak diagnosis control device conducts a leak diagnosis based on the atmospheric pressure and the pressure change inside the fuel vapor treatment system while the fuel vapor treatment system is closed off. The absolute pressure sensor measures the atmospheric pressure based on the open-closed status of the drain cut valve and the purge valve.

16 Claims, 10 Drawing Sheets

FUEL VAPOR TREATMENT SYSTEM WITH FAILURE DIAGNOSIS APPARATUS

BACKGROUND OF THE INVENTION

1. Field of the Invention

The present invention generally relates to a fuel vapor treatment system. More specifically, the present invention relates a fuel vapor treatment system equipped with a failure diagnosis apparatus.

2. Background Information

Engines are provided with a fuel vapor treatment apparatus or system (called an evaporation control system) that temporarily adsorbs fuel vapor generated inside the fuel tank in a canister, and then opens a purge valve when the engine enters a prescribed operating region to direct the fuel vapor adsorbed in the canister to the intake passage of the engine.

Such a fuel vapor treatment system sometimes has a diagnostic device for the purpose of detecting leaks in the piping and other components of the fuel vapor treatment system. The diagnostic device often uses the negative intake pressure of the engine to pull the fuel vapor treatment system to a negative pressure. The diagnostic device holds the system in a closed off state, monitors the change in pressure within the fuel vapor treatment system, and determines that there is an abnormality in the piping or components of the fuel vapor treatment system if the change in pressure is greater than or equal to a prescribed value. However, if the atmospheric pressure changes during the course of this leak diagnosis, the pressure inside the fuel vapor treatment system cannot be measured accurately.

Therefore, there are leak diagnosis devices that have an atmospheric pressure sensor in addition to the sensor that measures the pressure inside the fuel vapor treatment system. These leak diagnosis devices conduct the leak diagnosis by measuring both the atmospheric pressure and the pressure inside the fuel vapor treatment system. There are also leak diagnosis devices that have a selector valve in a pipe that connects to the fuel vapor treatment system and conduct the leak diagnosis by using the selector valve to selectively direct the pressure inside the fuel vapor treatment system and the atmospheric pressure to a pressure sensor. Examples of such fuel vapor treatment systems are disclosed in Japanese Laid-Open Patent Publication Nos. 2000-282970, 10-37813, and 07-317611.

In view of the above, there exists a need for an improved failure diagnosis apparatus for a fuel vapor treatment system. This invention addresses this need in the art as well as other needs, which will become apparent to those skilled in the art from this disclosure.

SUMMARY OF THE INVENTION

It has been discover that using of a plurality of sensors increases the cost of the fuel vapor treatment system. Also it has been discover that using a selector valve in order to measure the atmospheric pressure and the pressure inside the fuel vapor treatment system makes the structure of the system more complex and results in an inability to reduce cost.

Also, the prior art has also been problematic in that a misdiagnosis will occur if the relief valve provided on the filler cap of the fuel tank opens during the leak diagnosis.

An object of the present invention is to provide a fuel vapor treatment system that solves these problems.

In accordance with one aspect of the present invention, a fuel vapor treatment system is provided with a fuel tank, a canister, a purge valve, a drain cut valve, an absolute pressure sensor and a failure diagnosis control device. The canister is fluidly coupled to the fuel tank and configured to adsorb fuel vapor evaporated from the fuel tank. The purge valve is disposed to open and close piping that fluidly couples the canister to an intake passage of an internal combustion engine into which fuel vapor flows from the canister. The drain cut valve operatively coupled to the canister to open and close an atmospheric release port of the canister. The absolute pressure sensor is configured and arranged to detect absolute pressure inside the fuel vapor treatment system and measure atmospheric pressure based on an open-closed statuses of the drain cut valve and the purge valve. The failure diagnosis control device is configured and arranged to close off a portion of the fuel vapor treatment system between the fuel tank and the purge valve and conduct a leak diagnosis when a permisssion condition is met. The leak diagnosis control device is configured to conduct the leak diagnosis based on the atmospheric pressure and the change in pressure inside the portion of the fuel vapor treatment system while the portion of the fuel vapor treatment system is closed off.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
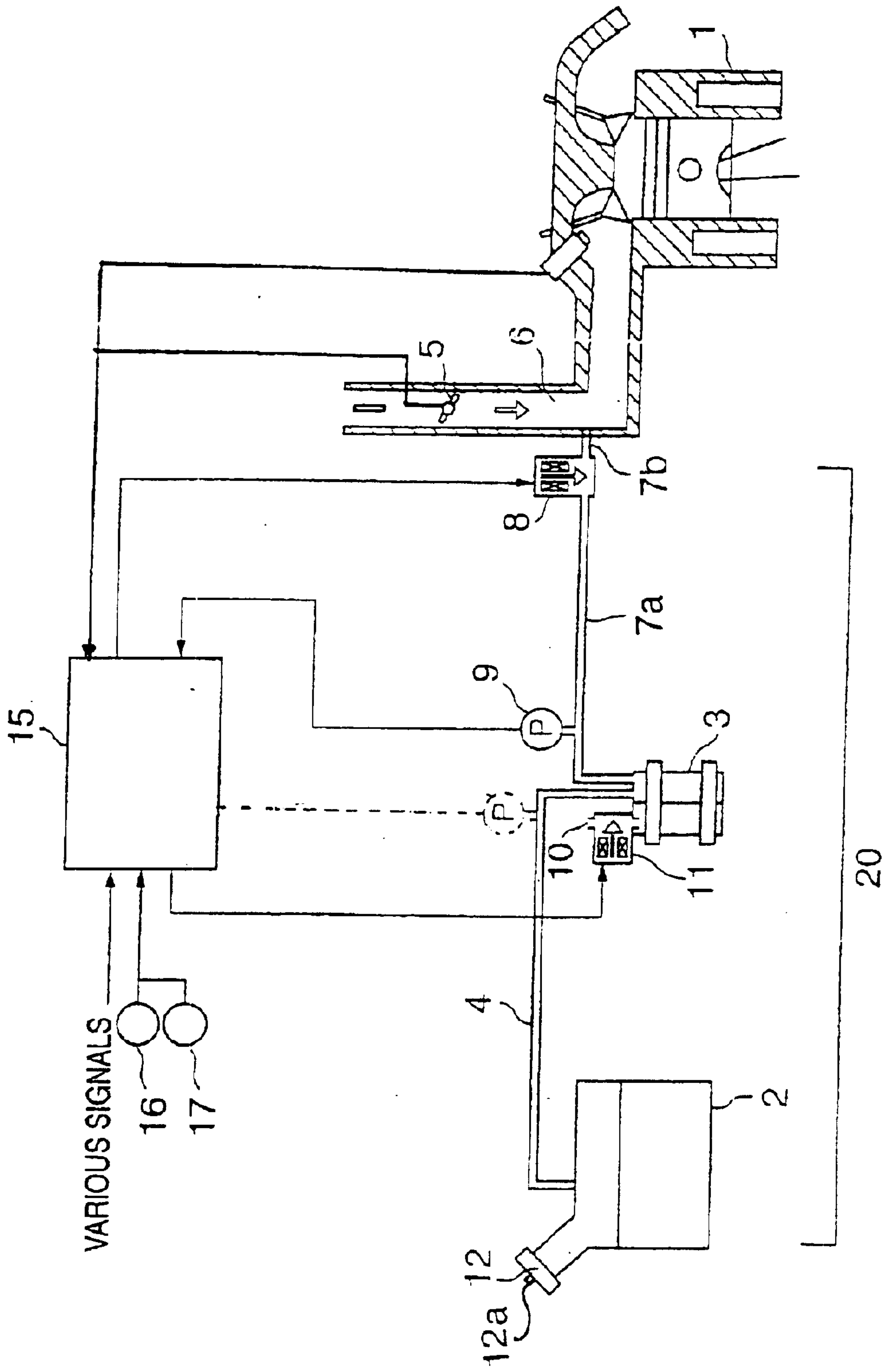
FIG. 1 is a schematic view of a fuel vapor treatment system in accordance with one embodiment of the present invention.

Referring initially to FIG. 1, a schematic view of a fuel vapor treatment system 20 is illustrated in accordance with a first embodiment of the present invention. The fuel vapor treatment system 20 serves to treat fuel vapor that is generated inside a fuel tank 2 of an engine 1 that is equipped with a canister 3 containing a fuel adsorbing material (e.g., activated carbon). The fuel tank 2 and the canister 3 are fluidly coupled together by a first purge pipe 4. The canister 3 is also fluidly coupled to an intake passage 6 by a pair of purge pipes 7*a* and 7*b* at location that is downstream of a throttle valve 5 of the engine 1. The purge pipes 4, 7*a* and 7*b* together form a purge piping that interconnects the fuel tank 2 to the intake passage 6 via the canister 3. The purge pipe 4 forms a first purge pipe extending between the fuel tank 2 and the canister 3, while the purge pipes 7*a* and 7*b* form a second purge pipe extending between the canister 3 and the intake passage 6.

A purge valve 8 is provided between the purge pipes 7*a* and 7*b* for opening and closing the connection between the purge pipes 7*a* and 7*b*. An absolute pressure sensor 9 measures both the pressure (absolute pressure) inside the purge piping and the atmospheric pressure (absolute pressure), in a manner described later. The absolute pressure sensor 9 is located between the fuel tank 2 and the purge valve 8. Thus, it is also acceptable to install the absolute pressure sensor 9 anywhere in the first purge pipe 4 such as shown in broken lines in FIG. 1.

The canister 3 is provided with an atmospheric release port 10. Preferably, the atmospheric release port 10 is part of a drain cut valve 11, which opens and closes the atmospheric release port 10. The atmospheric release port 10 is closed by the drain cut valve 11 during a leak diagnosis (discussed later). By using the drain cut valve 11 and the purge valve 8, only one absolute pressure sensor 9 is installed in the system 20 to measure both the pressure inside the system 20 and the atmospheric pressure based on the open-closed statuses of the drain cut valve 11 and the purge valve 8. Since the pressure inside the system 20 and the atmospheric pressure are both detected with the single absolute pressure sensor 9, the cost of the system 20 can be reduced considerably without causing the structure of the diagnosis apparatus to become complex.

Fuel vapor generated inside the fuel tank 2 is directed to the canister 3 through the first purge pipe 4. The fuel component of the vapor is adsorbed by the activated carbon inside the canister 3, while the remaining air is discharged to the outside through the atmospheric release port 10. Then, in order to treat the fuel adsorbed by the activated carbon, the purge valve 8 opens and fresh air is introduced into the canister 3 through the atmospheric release port 10 by utilizing the negative intake pressure downstream of the throttle valve 5. This fresh air causes the adsorbed fuel to separate from the activated carbon and be removed together with the fresh air into the intake passage 6 of the engine 1 through the purge pipes 7*a* and 7*b*.

The pressure value detected by the absolute pressure sensor 9 is sent to a controller that functions as both an atmospheric pressure setting device and a failure diagnosis device. The controller 15 preferably includes a microcomputer with a control program that controls the operation of the engine 1 and the fuel vapor treatment system 20 as discussed below. The controller 15 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The controller 15 is operatively coupled to the various sensors in a conventional manner. The internal RAM of the controller 15 stores statuses of operational flags and various control data. The internal ROM of the controller 15 stores the signals from the various sensors and the operational states of the purge valve 8 and the drain cut valve 11 for various operations. The controller 15 is capable of selectively controlling any of the components of the control system in accordance with the control program. It will be apparent to those skilled in the art from this disclosure that the precise structure and algorithms for the controller 15 can be any combination of hardware and software that will carry out the functions of the present invention. In other words, “means plus function” clauses as utilized in the specification and claims should include any structure or hardware and/or algorithm or software that can be utilized to carry out the function of the “means plus function” clause.

The controller 15 receives at least informational signals from a vehicle speed sensor 16, a fuel temperature sensor 17, and various other sensors (not shown) that detect the operating conditions of the engine. Based on the engine speed, intake air flow rate, throttle opening, coolant temperature, intake air temperature, vehicle speed, fuel temperature, fuel injection quantity, etc., the controller 15 opens and closes the purge valve 8 in specified operating regions (e.g., steady-state travel) and executes purge control (steady-state purge treatment) by controlling the opening and closing of the purge valve 8.

Meanwhile, based on the engine speed, intake air flow rate, throttle opening, coolant temperature, intake air temperature, vehicle speed, fuel temperature, fuel injection quantity, atmospheric pressure (according to the absolute pressure sensor 9), etc., the controller 15 determines the permission conditions necessary for executing a leak diagnosis of the fuel vapor treatment system 20 extending between the fuel tank 2 and the purge valve 8. If the permission conditions are satisfied, then the controller 15 executes the leak diagnosis.

The controller 15 also receives at least the following signals: an output signal indicating the boost pressure inside the intake passage 6, an ON-OFF signal from an ignition switch, an ON-OFF signal from a starter switch that starts a starter motor, a battery voltage signal, and an engine speed signal. Based on at least these input values, the controller 15 opens and closes the purge valve 8 and the drain cut valve 11 in response to the operating conditions of the engine 1 and controls the purging of the adsorbed fuel vapor from the canister 3. The purging of the adsorbed fuel vapor from the canister 3 will not be further discussed herein, since it does not specifically relate to the leak diagnosis of the present invention.

Next is a description of the leak diagnosis of the path between the fuel tank 2 and the purge valve 8 executed after the drain cut valve 11 has been diagnosed as operating in an abnormal manner.

The control details of a leak diagnosis performed on the fuel vapor treatment system 20 by the controller 15 will be explained based on the flowcharts shown in FIGS. 2 to 4.

Figure 2:
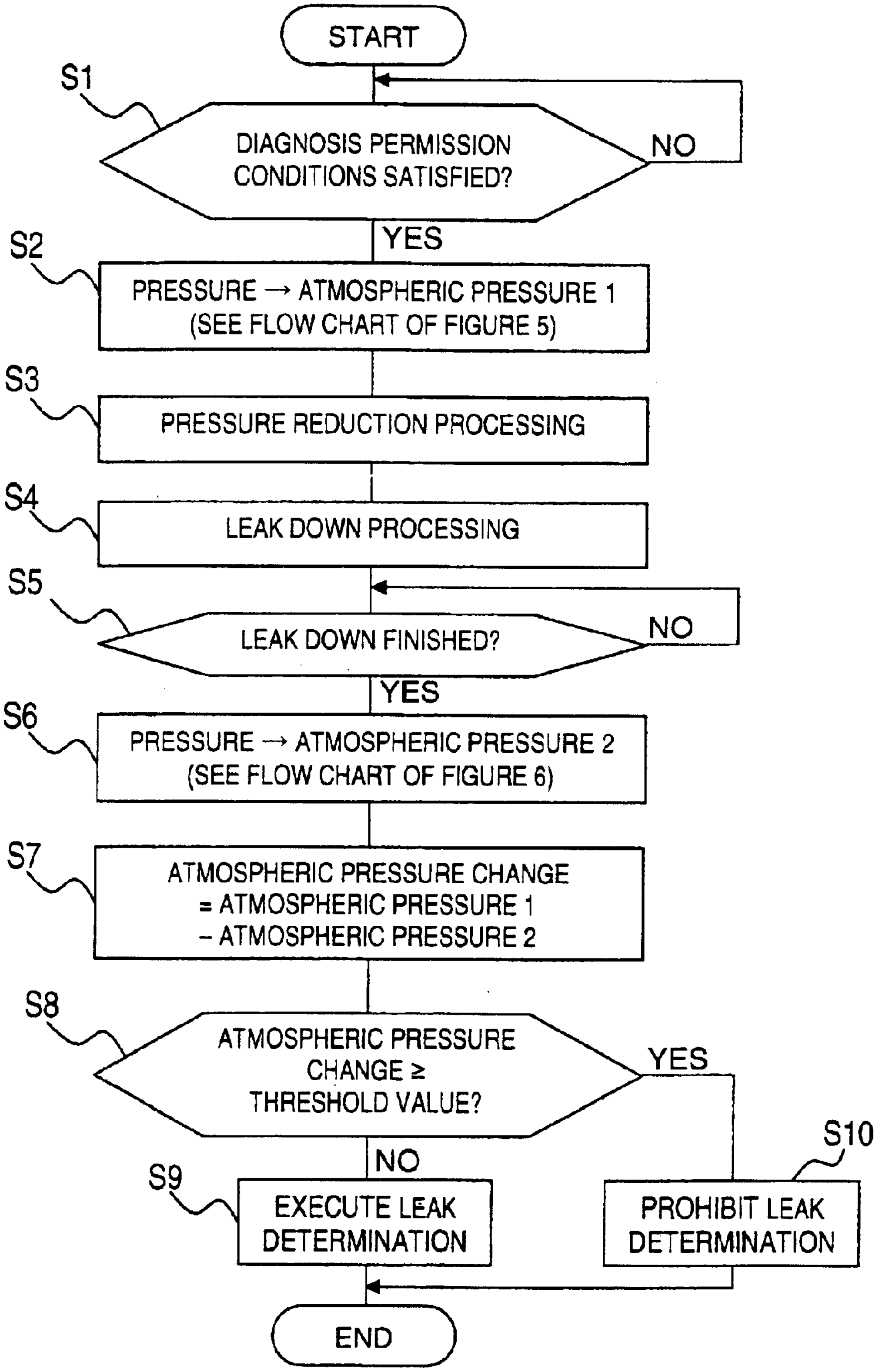
FIG. 2 is a control flowchart for performing a leak diagnosis in the fuel vapor treatment system illustrated FIG. 1 in accordance with the present invention.

As shown in FIG. 2, in Step 1, the controller 15 checks if the permission conditions for leak diagnosis are satisfied. The permission conditions are satisfied when all of the following conditions exist: (1) the engine is in a prescribed operating region in which the purge valve 8 is closed; (2) the coolant temperature, the intake air temperature, the fuel temperature, the atmospheric pressure, etc. are within prescribed ranges (e.g., the coolant temperature is below approximately 32° C., the intake air temperature is below approximately 50° C., the fuel temperature is below approximately 35° C., and the atmospheric pressure is above approximately 700 hPa); and (3) no abnormalities have been discovered by any other diagnosis.

If the leak diagnosis permission conditions are satisfied, then control proceeds to Step S2 where pre-diagnosis atmospheric pressure measurement processing is executed. This processing involves measuring a pre-leak diagnosis atmospheric pressure 1, which is the atmospheric pressure before the leak diagnosis.

Figure 3:
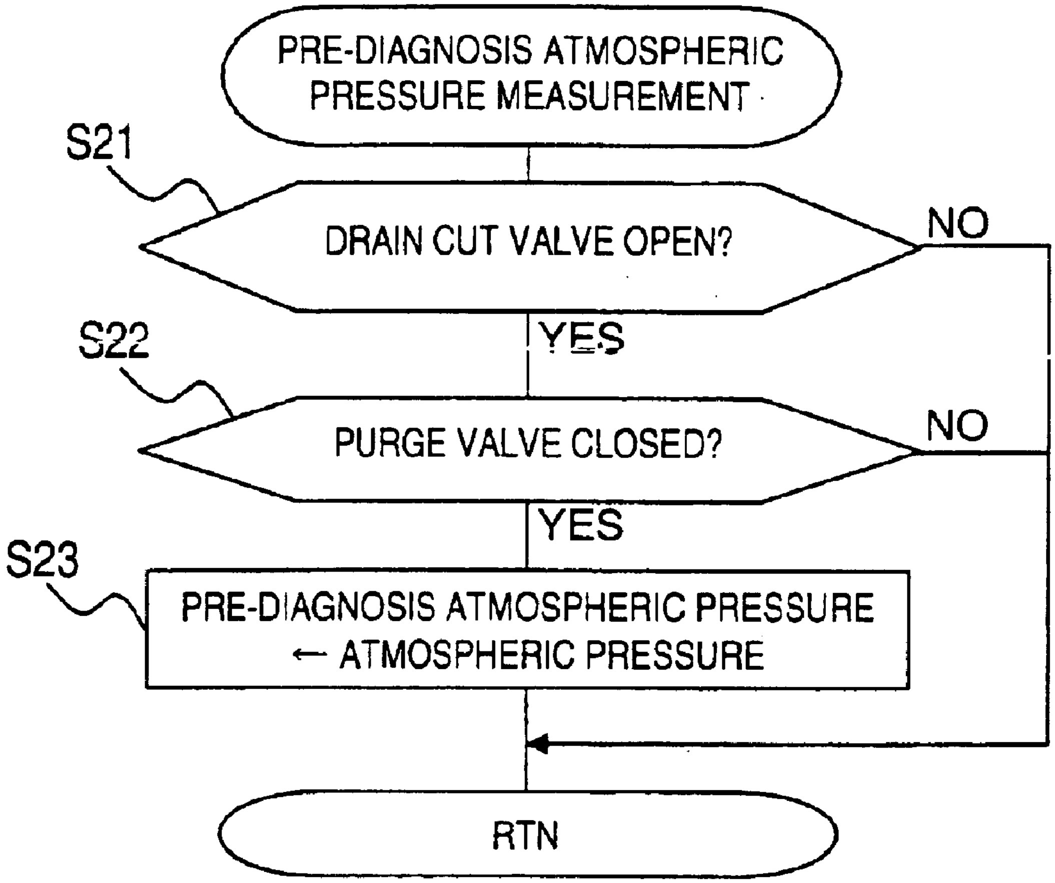
FIG. 3 is an additional control flowchart used in performing the leak diagnosis in the control flowchart of FIG. 2 in accordance with the present invention.

The steps of the pre-diagnosis atmospheric pressure measuring processing are shown in FIG. 3. As shown in FIG. 3, the pre-diagnosis atmospheric pressure measurement processing involves checking if the drain cut valve 11 is open in Step S21 and checking if the purge valve 8 is closed in Step S22.

If the drain cut valve 11 is open and the purge valve 8 is closed, the controller 15 proceeds to Step S23. In Step S23, the controller 15 reads in the current output value of the absolute pressure sensor 9 as the atmospheric pressure.

More particularly, when purge control is being executed, the drain cut valve 11 is open and the purge valve 8 is opened in accordance with the vehicle operating conditions. Consequently, the pressure inside the pipe 7*a* where the absolute pressure sensor 9 is installed goes negative due to the negative intake pressure of the engine 1. When the purge valve 8 is subsequently closed, the negative intake pressure of the engine is blocked and the pressure inside the pipes 4, 7*a* and 7*b* becomes atmospheric pressure. It is in this state that the absolute pressure sensor 9 detects the pre-leak diagnosis atmospheric pressure 1.

Next, in Step S3, the controller 15 executes pressure reduction processing, which involves closing the drain cut valve 11, opening the purge valve 8, and reducing (pulling down) the pressure inside the fuel vapor treatment system 20 to a prescribed negative pressure using the negative intake pressure of the engine 1.

When the pressure reduction processing is finished, the controller 15 proceeds to Step S4 where leak down processing (leak diagnosis) is executed. This processing involves closing the purge valve 8 so as to block off the fuel vapor treatment system 20 and detecting the pressure change inside the fuel vapor treatment system 20 using the absolute pressure sensor 9.

In this leak diagnosis, the controller 15 measures how much the pressure inside the fuel vapor treatment system 20 has increased in a predetermined amount of time.

When the leak diagnosis is finished, the controller 15 proceeds from Step S5 to Step S6, where post-diagnosis atmospheric pressure measurement processing is executed. This processing involves opening the drain cut valve 11and measuring a post-diagnosis atmospheric pressure 2, which is the atmospheric pressure after the leak diagnosis.

Figure 4:
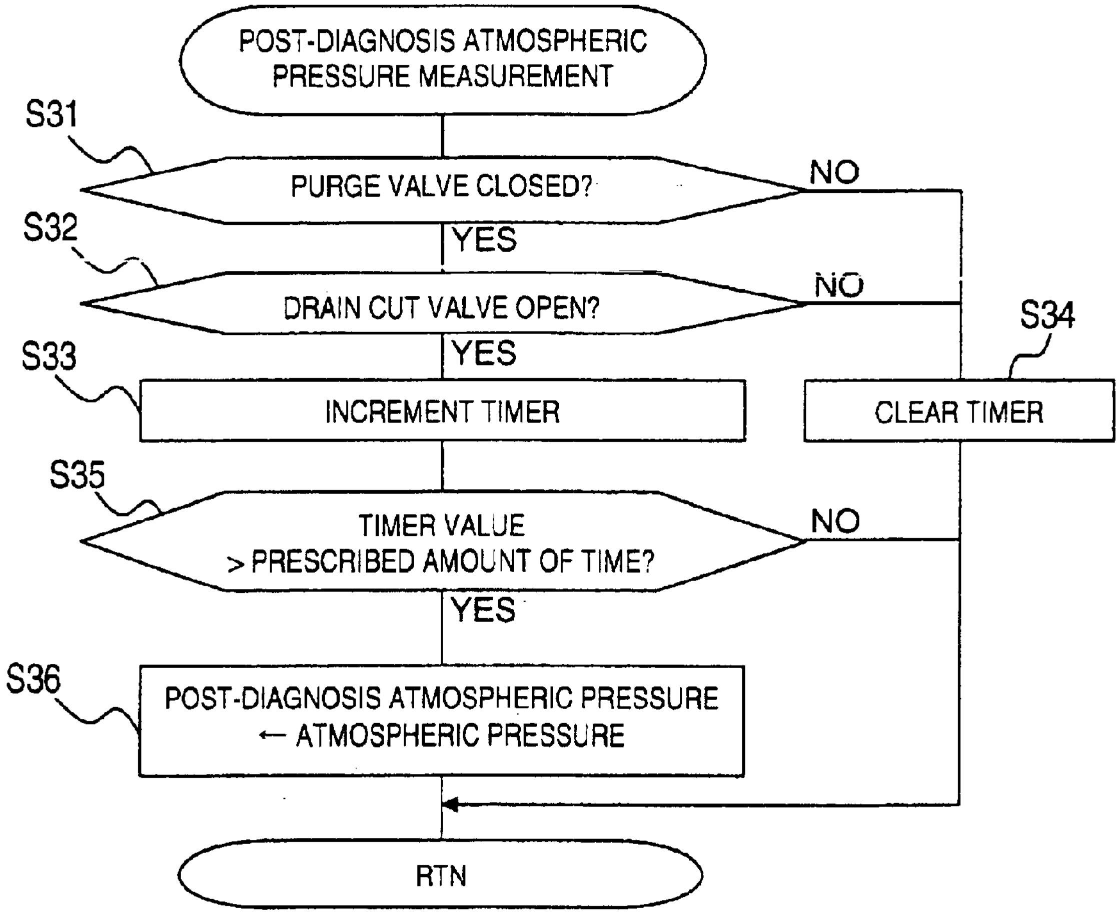
FIG. 4 is an additional control flowchart used in performing the leak diagnosis in the control flowchart of FIG. 2 in accordance with the present invention

As shown in FIG. 4, the post-diagnosis atmospheric pressure measurement processing involves checking if the purge valve 8 is closed in Step S31 and checking if the drain cut valve 11 is open in Step S32. Thus, with this invention, the atmospheric pressure can be detected accurately with the single absolute pressure sensor 9.

If the purge valve 8 is not closed or the drain cut valve 11 is not open, the timer that measures the time is cleared in Step S34.

If the purge valve 8 is closed and the drain cut valve 11 is open, the timer increments in Step S33 to calculate the amount of time this state has continued. Then, the controller 15 then proceeds to Step S35.

In Step S35, if the time calculated by the timer has reached a prescribed amount of time, i.e., if a prescribed amount of time, such as about one second, has elapsed while the purge valve 8 has remained closed and the drain cut valve 11 has remained open, the controller 15 proceeds to Step S36. In Step S3, the controller 15 reads in the current output valve of the absolute pressure sensor 9 as the atmospheric pressure. Thus, with this invention, the atmospheric pressure can be detected accurately with the single absolute pressure sensor 9.

Thus, after the leak diagnosis, atmospheric air is introduced into the pipe 7*a* (where the absolute pressure sensor 9 is arranged) by opening the drain cut valve 11. When the purge valve 8 has been closed and the drain cut valve 11 has been open for a prescribed amount of time, such as about one second, the inside of the pipe 7 reaches atmospheric pressure and the absolute pressure sensor 9 detects the post-leak diagnosis atmospheric pressure 2.

Next, control proceeds to Step S7 where the change in the atmospheric pressure is calculated based on the difference between the pre-leak diagnosis atmospheric pressure 1 and the post-leak diagnosis atmospheric pressure 2. Thus, with this invention, the change in the atmospheric pressure can be detected reliably.

In Step S8, the change in the atmospheric pressure is compared to a prescribed threshold value. If the change in atmospheric pressure is less than the prescribed threshold value, a leak determination is conducted in Step S9.

The leak determination involves comparing the datum or value (increase in pressure inside the fuel vapor treatment system 20 during a predetermined amount of time) obtained in Step S4 with a prescribed value and determining the fuel vapor treatment system 20 to be normal if the datum or value is less than or equal to the prescribed value and abnormal if the datum or value is greater than the prescribed value.

Meanwhile, if the change in atmospheric pressure is greater than or equal to the prescribed threshold value, such as about 4 mmHg, then control proceeds to Step S10 where the leak determination is prohibited, i.e., the datum or value measured in Step S4 is canceled.

Figure 5:
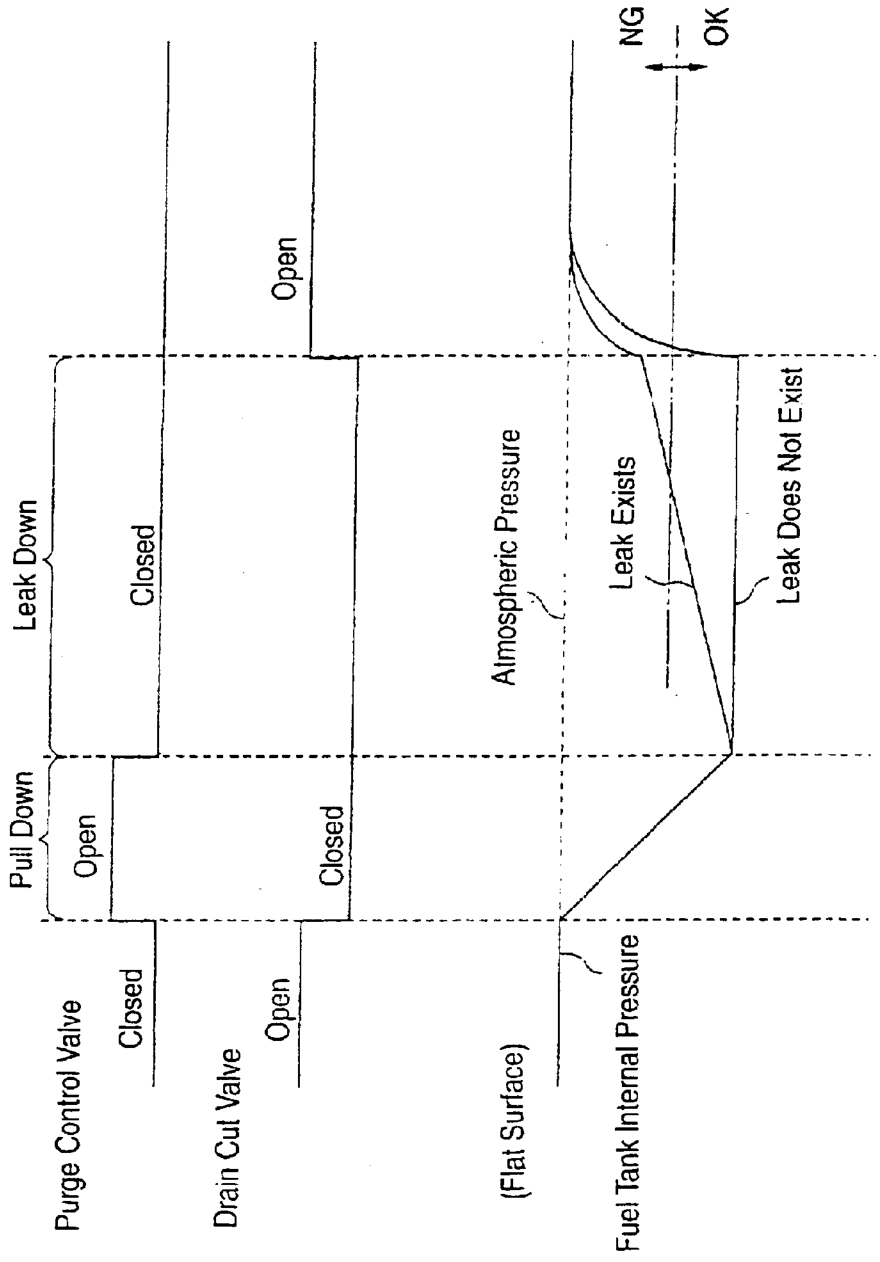
FIG. 5 is a first leak diagnosis control timing chart for the leak diagnosis performed by FIG. 2 on the fuel vapor treatment system illustrated FIG. 1 in accordance with the present invention.
Figure 6:
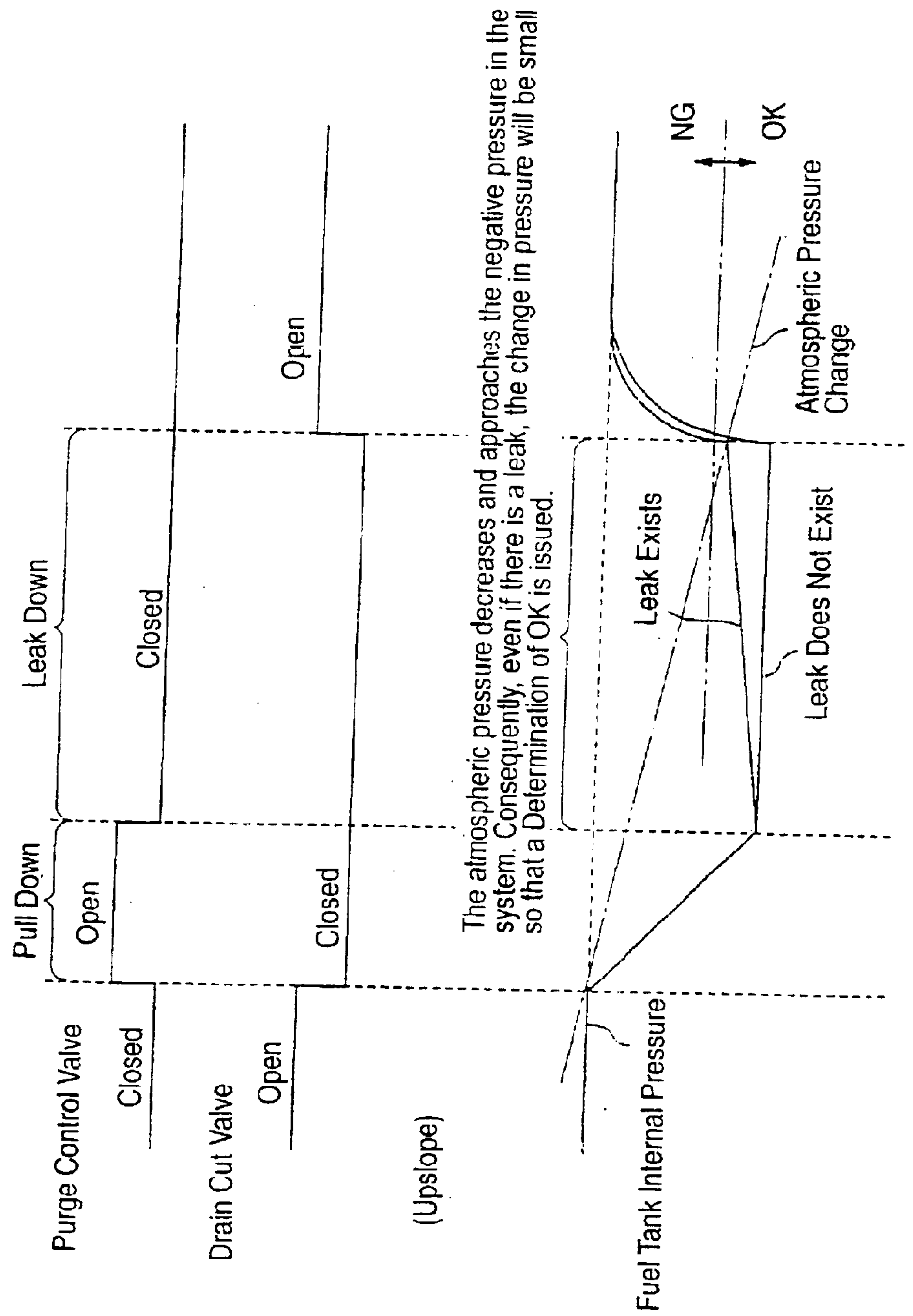
FIG. 6 is a second leak diagnosis control timing chart for the leak diagnosis performed by FIG. 2 on the fuel vapor treatment system illustrated FIG. 1 in accordance with the present invention.

FIGS. 5 and 6 show timing charts for controlling the leak diagnosis. FIG. 5 illustrates a case where the atmospheric pressure does not change. If there is not a leak, the pressure inside the fuel vapor treatment system 20 (inside the fuel tank 2) will not change during the leak diagnosis. On the other hand, the diagnosis will indicate an abnormality (leak) if the increase in pressure inside the fuel vapor treatment system 20 within a predetermined amount of time exceeds a prescribed value. FIG. 6 illustrates a case where the atmospheric pressure changes during the leak diagnosis. If the change in atmospheric pressure exceeds a prescribed value, the leak determination is prohibited.

Thus, by arranging one the absolute pressure sensor 9 in the fuel vapor treatment system 20, both the pressure inside the fuel vapor treatment system 20 and the atmospheric pressure can be detected without installing a plurality of pressure sensors and the cost can be lowered.

The atmospheric pressure can be detected with good precision because the atmospheric pressure is detected when the drain cut valve 11 is open and the purge valve 8 is closed. Furthermore, since both the pressure inside the fuel vapor treatment system 20 and the atmospheric pressure can be detected with a single the absolute pressure sensor 9, the structure of the diagnostic system does not become complex and the cost can be reduced even further.

Meanwhile, during the leak diagnosis control, the atmospheric pressure is detected by the absolute pressure sensor 9 before and after the leak diagnosis and if the change in atmospheric pressure exceeds a prescribed value, the leak determination is prohibited. As a result, the change in atmospheric pressure can be detected with certainty and an incorrect leak diagnosis can be prevented.

For example, if the vehicle experiences a decrease in atmospheric pressure caused by climbing a hill after the leak diagnosis has started, the difference between the pressure inside the fuel vapor treatment system 20 and the atmospheric pressure will decrease, as shown in FIG. 6. Consequently, even if there is a leak, the increase in pressure inside the fuel vapor treatment system 20 will be small. If the atmospheric pressure changes beyond a prescribed value, such as about 4 mmHg, the leak determination is prohibited so that misdiagnosis can be prevented. In other words, misdiagnosis caused by changes in the atmospheric pressure can be prevented in the fuel vapor treatment system 20.

When the leak diagnosis is finished, there is still negative pressure inside the fuel vapor treatment system 20 immediately after the drain cut valve 11 is opened and while the purge valve 8 remains closed. However, the change in atmospheric pressure can be detected more reliably because the post-leak diagnosis atmospheric pressure is detected when a prescribed amount of time, such as about one second, has elapsed after opening the drain cut valve 11.

The present invention can also be arranged such that, before commencing the leak diagnosis, a prescribed amount of time, such as about one second, is waited after closing the purge valve 8 until the pre-leak diagnosis atmospheric pressure is detected.

Figure 7:
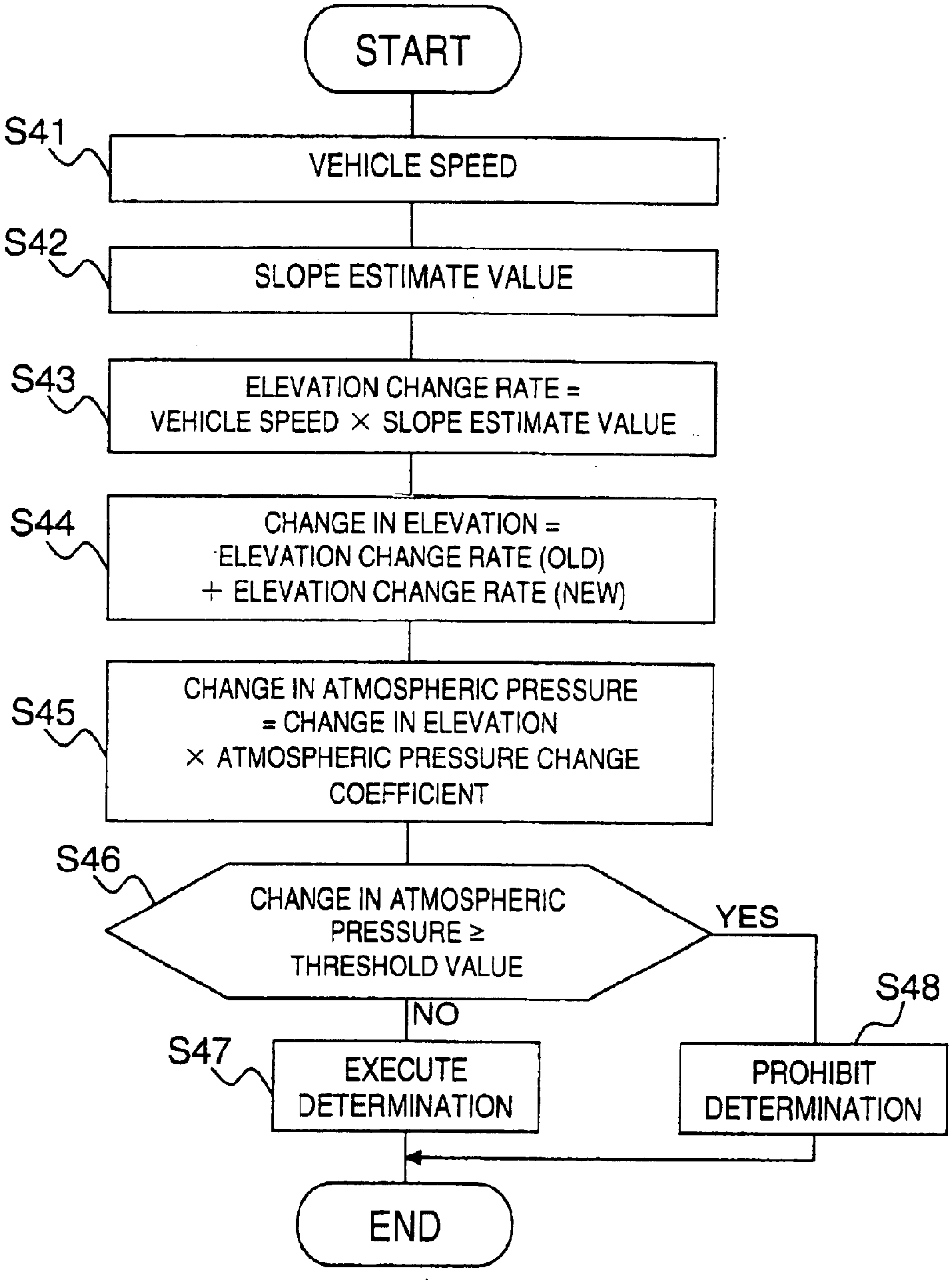
FIG. 7 is a control flowchart for performing a leak diagnosis in the fuel vapor treatment system illustrated FIG. 1 in accordance with another embodiment of the present invention.

Referring now to FIG. 7, a modified leak diagnosis in accordance with a second embodiment of the present invention is performed on the fuel vapor treatment system 20. The modified leak diagnosis is performed by the leak diagnosis control device or section of the controller 15 on the fuel vapor treatment system 20. In this embodiment, the leak diagnosis control device or section of the controller 15 is configured to estimate the change in atmospheric pressure based on a vehicle speed detected by the vehicle speed sensor or detecting device 16 and a road slope estimated by the road slope estimating device or section of the controller 15.

The control details of this modified leak diagnosis will be explained based on the flowchart shown in FIG. 7. Here, instead of detecting the atmospheric pressure with the absolute pressure sensor 9, the change in atmospheric pressure is estimated based on the vehicle speed and slope of the road. With this embodiment of the present invention, real time diagnosis cancellation can be accomplished by estimating the change in atmospheric pressure based on the vehicle speed and the road slope.

Control starts when the leak diagnostic permission conditions have been satisfied. In other words, based on the engine speed, intake air flow rate, throttle opening, coolant temperature, intake air temperature, vehicle speed, fuel temperature, fuel injection quantity, atmospheric pressure (according to the absolute pressure sensor 9), etc., the controller 15 determines the permission conditions necessary for executing a leak diagnosis of the fuel vapor treatment system 20 extending between the fuel tank 2 and the purge valve 8. If the permission conditions are satisfied, then the controller 15 executes the leak diagnosis.

In Step S41, the controller 15 reads in and stores the vehicle speed from the vehicle speed sensor 16. At this point and/or just prior to this point, the controller 15 reads in and stores engine speed, intake air flow rate, throttle opening, coolant temperature, intake air temperature, fuel temperature, fuel injection quantity, atmospheric pressure, etc to determine the current engine speed and the engine load.

In Step S42, the controller 15 estimates the slope of the road. Here, the controller 15 compares the current engine speed and the engine load (throttle position, etc.) with the previously stored engine speed and the previously stored engine load (throttle position, etc.) that corresponds to traveling on a level surface. Based on this comparison, the controller 15 estimates the slope of the road based on the relative size or the relative difference between the respective previously stored values and the respective current values for engine speed and engine load.

In Step S43, the controller 15 calculates the change in elevation per unit time, i.e., elevation change rate, by multiplying the vehicle speed by the slope estimate value. The slope estimate value and elevation change rate are positive when the vehicle is climbing and negative when the vehicle is descending.

In Step S44, the elevation change rate is cumulated each computational timing cycle to obtain the change in elevation.

In Step S45, the elevation change is multiplied by an atmospheric pressure change coefficient to obtain the change in atmospheric pressure. An acceptable atmospheric pressure change coefficient is, for example, 9 mmHg per 100 m change in elevation.

From Step 546 on, the leak determination part of the leak diagnosis is conducted or prohibited based on the change in atmospheric pressure. More specifically, the leak determination part of the leak diagnosis is conducted if the change in atmospheric pressure is less than the threshold value (Step 547). and prohibited if the change in atmospheric pressure is equal to or greater than the threshold value (Step S48).

With this arrangement, there is no need to wait for the results obtained from monitoring the change in atmospheric pressure before and after the leak diagnosis. Rather, the leak diagnosis can be cancelled in real time.

Figure 8:
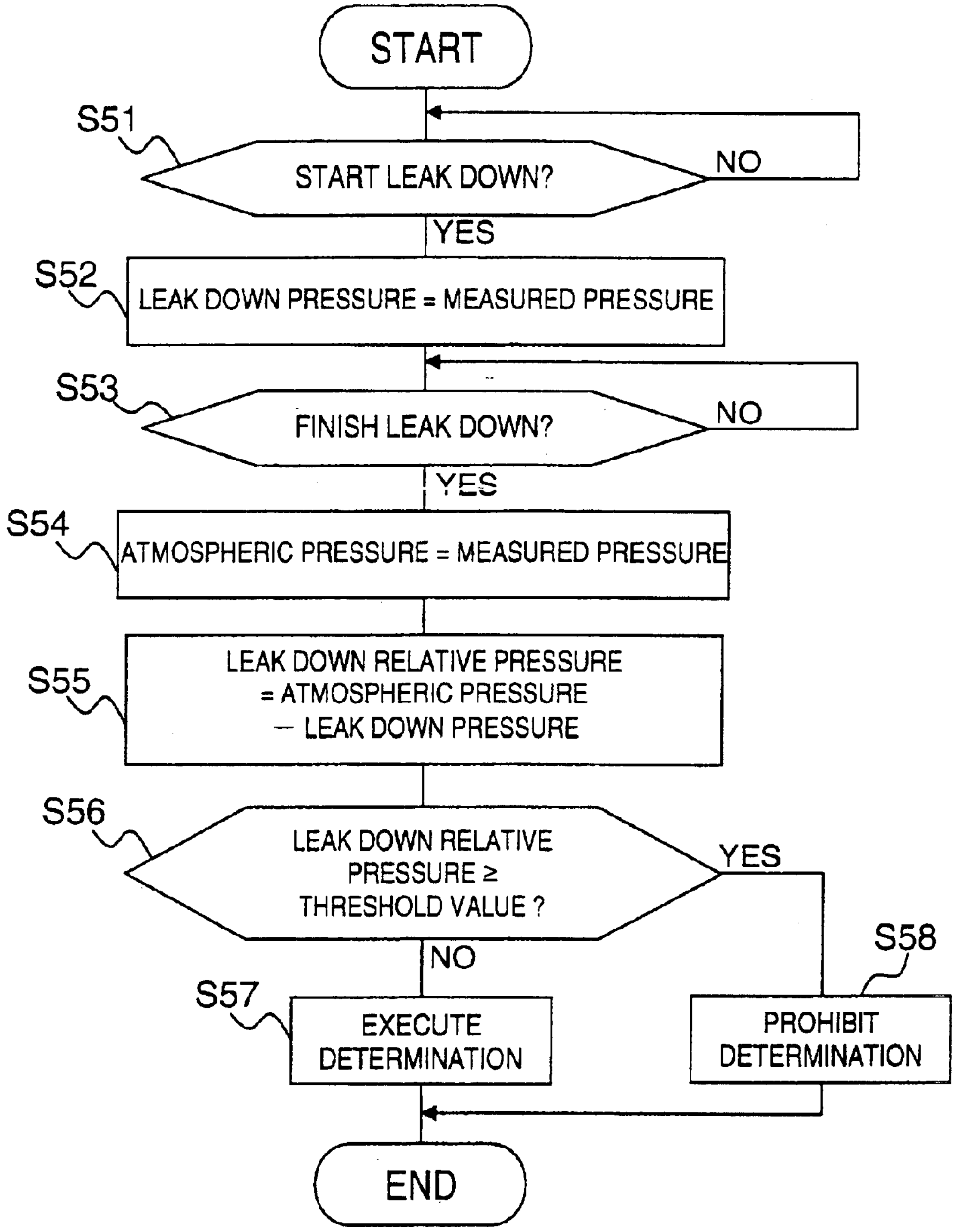
FIG. 8 is a control flowchart for performing a leak diagnosis in the fuel vapor treatment system illustrated FIG. 1 in accordance with another embodiment of the present invention.

Referring now to FIG. 8, a flowchart is shown for a modified leak diagnosis in accordance with a third embodiment of the present invention. In this embodiment, the leak diagnosis control device or section of the controller 15 is configured to determine that the condition for canceling the leak diagnosis result is satisfied when a difference between the atmospheric pressure and the pressure inside the portion of the fuel vapor treatment system undergoing the leak diagnosis is greater than or equal to an opening pressure of a relief valve 12*a* provided in a filler cap 12 of the fuel tank 2. The leak diagnosis control section of the controller 15 is further configured to detect atmospheric pressure after the leak diagnosis. The leak diagnosis control section of the controller 15 is further configured to obtain the atmospheric pressure after the leak diagnosis by detecting an output value of the absolute pressure sensor 9 when the drain cut valve 11 has been open for a prescribed amount of time such as about one second after the leak diagnosis.

The control details of this modified leak diagnosis performed on the fuel vapor treatment system 20 by the leak diagnosis control section of the controller 15 will be explained based on the flowchart shown in FIG. 8 and the timing chart shown in FIG. 9. With the modified leak diagnosis in accordance with a third embodiment of the present invention, misdiagnosis caused by opening of the release valve 12*a* of the fuel tank filler cap 12 can be prevented.

During the leak diagnosis, this embodiment prohibits the leak determination when the difference between the atmospheric pressure and the pressure inside the fuel vapor treatment system 20 is greater than or equal to the opening pressure (about −35 mmHg±10 mmHg) of the relief valve 12*a* provided in the filler cap 12 of the fuel tank 2. Thus, the leak determination is prohibited when the pressure difference between the atmospheric pressure and the pressure inside the fuel vapor treatment system 20 is greater than or equal to about −25 mmHg. For a further margin of safety, this pressure difference is set to −20 mmHg so that the leak determination is prohibited when the pressure difference between the atmospheric pressure and the pressure inside the fuel vapor treatment system 20 is greater than or equal to about −20 mmHg.

In Step S51, the controller 15 determines whether or not to start leak down processing (leak diagnosis).

If leak down processing is started, in Step S52 the controller 15 takes the minimum value of the pressure inside the fuel vapor treatment system 20 detected by the absolute pressure sensor 9 during the leak down processing and stores it as the leak down pressure.

When the leak down processing is finished, control proceeds from Step S53 to Step S54 where the controller 15 opens the drain cut valve 11 and the stores the post-leak diagnosis atmospheric pressure detected by the absolute pressure sensor 9.

In Step S55, the controller 15 calculates the difference (leak down relative pressure) between the post-leak diagnosis atmospheric pressure and the leak down pressure.

In Step S56, the controller 15 compares the leak down relative pressure with the opening pressure (prescribed threshold value) of the relief valve provided in the filler cap 12 of the fuel tank 2. If the leak down relative pressure is smaller than the opening pressure, the controller 15 executes the leak determination (Step S57).

Meanwhile, if the leak down pressure is greater than or equal to the opening pressure, the controller 15 prohibits the leak determination (Step S58).

Figure 9:
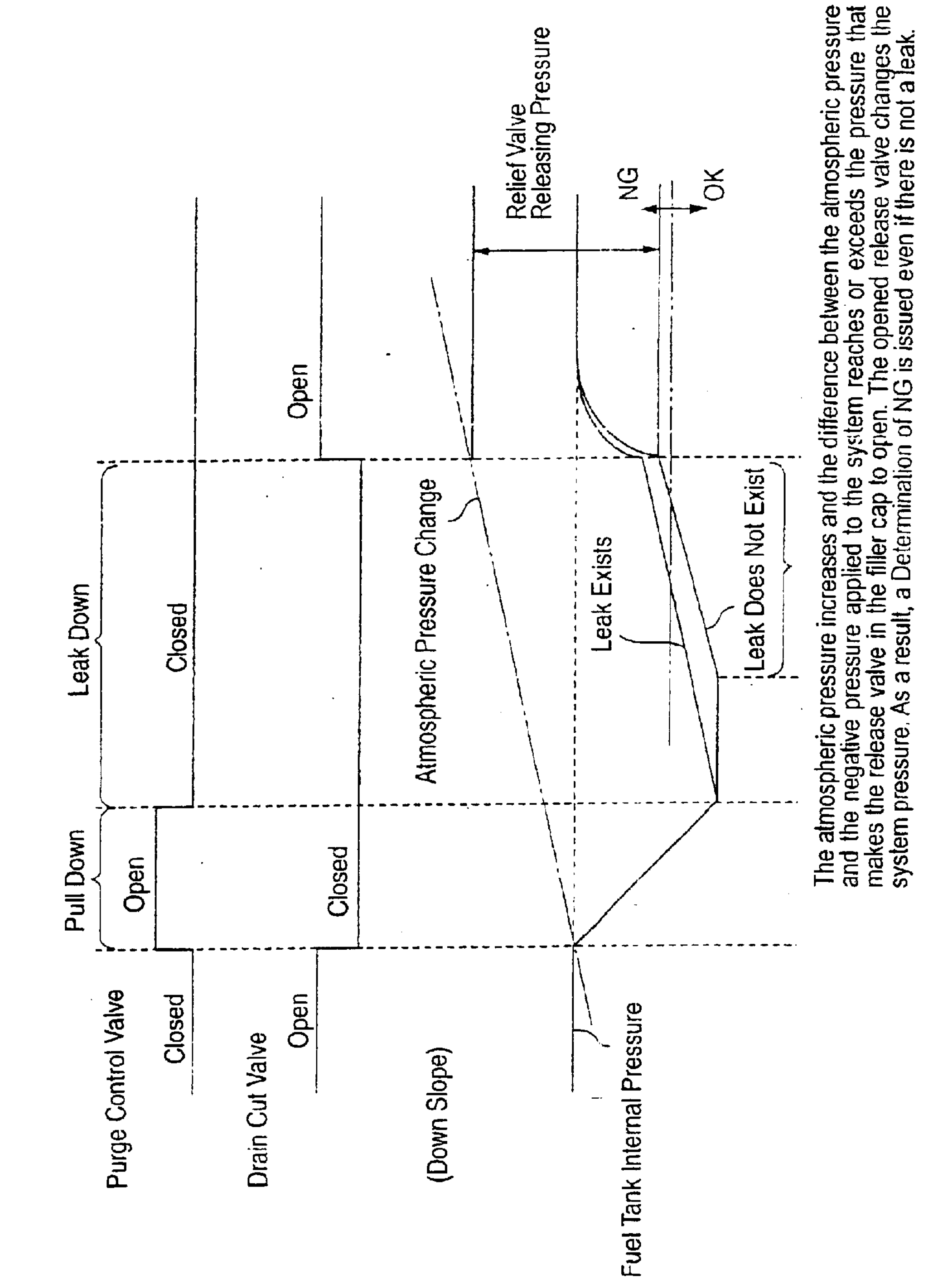
FIG. 9 is a leak diagnosis control timing chart for the leak diagnosis performed by FIG. 8 on the fuel vapor treatment system illustrated FIG. 1 in accordance with the present invention.

As seen in FIG. 9, a timing chart is shown for the leak diagnosis control just described in FIG. 8. After the leak diagnosis is started, assume, for example, that the atmospheric pressure rises due to the vehicle descending a hill. When the relative pressure, i.e., difference between the atmospheric pressure and the pressure inside the fuel vapor treatment system 20, becomes large, even if there is no leak the relief valve of the filler cap 12 will open and atmospheric air will flow into the fuel vapor treatment system 20, possibly increasing the pressure inside the fuel vapor treatment system 20. However, since the leak determination is prohibited when the difference between the atmospheric pressure and the pressure inside the fuel vapor treatment system 20 is greater than or equal to the opening pressure of the relief valve of the filler cap 12, misdiagnosis caused by the operation of the relief valve of the filler cap 12 can be prevented.

Figure 10:
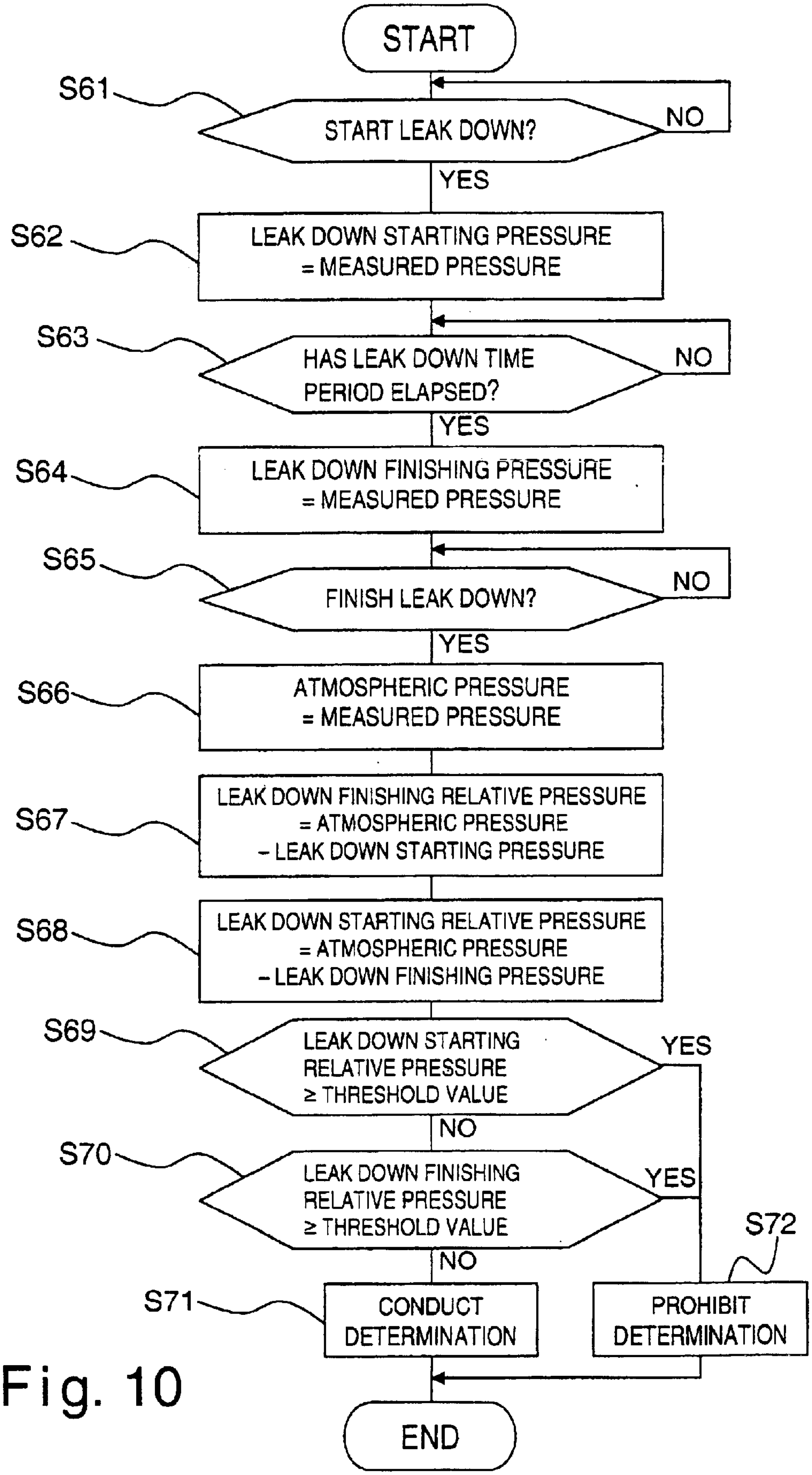
FIG. 10 is a control flowchart for performing a leak diagnosis in the fuel vapor treatment system illustrated FIG. 1 in accordance with another embodiment of the present invention.

Referring now to FIG. 10, a flowchart is shown for a modified leak diagnosis in accordance with a fourth embodiment of the present invention. The control details of a modified leak diagnosis performed on the fuel vapor treatment system 20 by the controller 15 will be explained based on the flowchart shown in FIG. 10. This embodiment measures the pressure inside the fuel vapor treatment system 20 when the leak diagnosis starts and when the leak diagnosis ends. The leak determination is prohibited when the difference between these pressures and the atmospheric pressure is greater than or equal to the opening pressure of the relief valve in the filler cap 12 of the fuel tank 2.

In Step S61, the controller 15 determines whether or not to start leak down processing (leak diagnosis).

If leak down processing is started, in Step S62, the controller 15 stores the pressure inside the fuel vapor treatment system 20 detected by the absolute pressure sensor 9 as the leak down starting pressure.

In Step S63, the controller 15 measures the leak down time.

When the leak down time period has elapsed, in Step S64 the controller 15 stores the pressure inside the fuel vapor treatment system 20 detected by the absolute pressure sensor 9 as the leak down finishing pressure.

When the leak down processing is finished, control proceeds from Step S65 to Step S66 where the controller 15 opens the drain cut valve 11 and the stores the post-leak diagnosis atmospheric pressure detected by the absolute pressure sensor 9.

In Step S67, the controller 15 calculates the difference (leak down starting relative pressure) between the post-leak diagnosis atmospheric pressure and the leak down starting pressure and in Step S68 it calculates the difference (leak down finishing relative pressure) between the post-leak diagnosis atmospheric pressure and the leak down finishing pressure.

In Steps S69 and S70, the controller 15 compares the leak down starting relative pressure and the leak down finishing relative pressure with the opening pressure (prescribed threshold value) of the relief valve provided in the filler cap 12 of the fuel tank 2. If both are smaller than the opening pressure, the controller 15 executes the leak determination (Step S71).

Meanwhile, if either of the leak down starting relative pressure and the leak down finishing relative pressure is greater than or equal to the opening pressure, the controller 15 prohibits the leak determination (Step S72).

With this embodiment, the pressure measurement is easier to conduct than in the fourth embodiment, where the minimum value of the pressure inside the fuel vapor treatment system 20 was detected. Furthermore, it is also acceptable to detect only the leak down starting pressure.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-219000. The entire disclosure of Japanese Patent Application No. 2001-219000 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fuel vapor treatment system comprising:

a fuel tank;

a canister fluidly coupled to the fuel tank and configured to adsorb fuel vapor evaporated from the fuel tank;

a purge valve disposed to open and close piping that fluidly couples the canister to an intake passage of an internal combustion engine into which fuel vapor flows from the canister;

a drain cut valve operatively coupled to the canister to open and close an atmospheric release port of the canister;

an absolute pressure sensor configured and arranged to detect absolute pressure inside the fuel vapor treatment system and measure atmospheric pressure based on an open-closed statuses of the drain cut valve and the purge valve; and a failure diagnosis control device configured and arranged to close off a portion of the fuel vapor treatment system between the fuel tank and the purge valve and conduct a leak diagnosis when a permission condition is met, the leak diagnosis control device being configured to conduct the failure diagnosis based on atmospheric pressure and a pressure change inside the portion of the fuel vapor treatment system while the portion of the fuel vapor treatment system is closed off, the failure diagnosis control device being further configured to cancel a leak diagnosis result obtained by the leak diagnosis when a predetermined condition for canceling the leak diagnosis result is determined, the failure diagnosis control device being further configured to determine that the predetermined condition for canceling the leak diagnosis result is satisfied when a change in atmospheric pressure exceeds a prescribed value with the change in atmospheric pressure being detected by comparing a first output value detected by the absolute pressure sensor before conducting the leak diagnosis and a second output value detected by the absolute pressure sensor after conducting the leak diagnosis.

2. The fuel vapor treatment system as recited in claim 1, wherein the failure diagnosis control device is further configured to set an output value detected by the absolute pressure sensor as the atmospheric pressure used in conducting the leak diagnosis when the drain cut valve is open and the purge valve is closed.

3. The fuel vapor treatment system as recited in claim 2, wherein the failure diagnosis control device is further configured to obtain a post-leak diagnosis atmospheric pressure by detecting the second output value when the drain cut valve has been open for a prescribed amount of time after conducting the leak diagnosis.

4. The fuel vapor treatment system as recited in claim 1, wherein the failure diagnosis control device is further configured to obtain a post-leak diagnosis atmospheric pressure by detecting the second output value when the drain cut valve has been open for a prescribed amount of time after conducting the leak diagnosis.

5. A fuel vapor treatment system comprising:

a fuel tank;

a canister fluidly coupled to the fuel tank and configured to adsorb fuel vapor evaporated from the fuel tank;

a purge valve disposed to open and close piping that fluidly couples the canister to an intake passage of an internal, combustion engine into which fuel vapor flows from the canister;

a drain cut valve operatively coupled to the canister to open and close an atmospheric release port of the canister;

an absolute pressure sensor configured and arranged to detect absolute pressure inside the fuel vapor treatment system and measure atmospheric pressure based on an open-closed statuses of the drain cut valve and the purge valve;

a vehicle speed detecting device and a road slope estimating device; and a failure diagnosis control device configured and arranged to close off a portion of the fuel vapor treatment system between the fuel tank and the purge valve and conduct a leak diagnosis when a permission condition is met, the leak diagnosis control device being configured to conduct the failure diagnosis based on atmospheric pressure and a pressure change inside the portion of the fuel vapor treatment system while the portion of the fuel vapor treatment system is closed off, the failure diagnosis control device being further configured to cancel a leak diagnosis result obtained by the leak diagnosis when a predetermined condition for canceling the leak diagnosis result is determined, the failure diagnosis control device being further configured to determine that the predetermined condition for canceling the leak diagnosis result is satisfied when a change in atmospheric pressure exceeds a prescribed value with the change in atmospheric pressure being estimated based on a vehicle speed detected by the vehicle speed detecting device and a road slope estimated by the road slope estimating device.

6. A fuel vapor treatment system, comprising:

a fuel tank;

a canister fluidly coupled to the fuel tank and configured to adsorb fuel vapor evaporated from the fuel tank;

a purge valve disposed to open and close piping that fluidly couples the canister to an intake passage of an internal combustion engine into which fuel vapor flows from the canister;

a drain cut valve operatively coupled to the canister to open and close an atmospheric release port of the canister;

an absolute pressure sensor configured and arranged to detect absolute pressure inside the fuel vapor treatment system and measure atmospheric pressure based on an open-closed statuses of the drain cut valve and the purge valve; and a failure diagnosis control device configured and arranged to close off a portion of the fuel vapor treatment system between the fuel tank and the purge valve and conduct a leak diagnosis when a permission condition is met, the failure diagnosis control device being configured to conduct the leak diagnosis based on atmospheric pressure and a pressure change inside the portion of the fuel vapor treatment system while the portion of the fuel vapor treatment system is closed off, the failure diagnosis control device being further configured to determine that a predetermined condition for canceling the leak diagnosis result is satisfied when a difference between the atmospheric pressure and the pressure inside the portion of the fuel vapor treatment system undergoing the leak diagnosis is greater than or equal to an opening pressure of a relief valve provided in a filler cap of the fuel tank.

7. The fuel vapor treatment system as recited in claim 6, wherein the failure diagnosis control device is further configured to use the atmospheric pressure detected after conducting the leak diagnosis when making a determination that the predetermined condition for canceling the leak diagnosis result is satisfied.

8. The fuel vapor treatment system as recited in claim 7, wherein the failure diagnosis control device is further configured to use the atmospheric pressure detected after conducting the leak diagnosis by the absolute pressure sensor detecting an output value when the drain cut valve has been open for a prescribed amount of time after conducting the leak diagnosis.

9. A fuel vapor treatment system, comprising:

a fuel tank;

a canister fluidly coupled to the fuel tank and configured to adsorb fuel vapor evaporated from the fuel tank;

a purge valve disposed to open and close piping that fluidly couples the canister to an intake passage of an internal combustion engine into which fuel vapor flows from the canister;

a drain cut valve operatively coupled to the canister to open and close an atmospheric release port of the canister;

an absolute pressure sensor configured and arranged to detect absolute pressure inside the fuel vapor treatment system and measure atmospheric pressure based on an open-closed statuses of the drain cut valve and the purge valve; and a failure diagnosis control device configured and arranged to close off a portion of the fuel vapor treatment system between the fuel tank and the purge valve and conduct a leak diagnosis when a permission condition is met, the failure diagnosis control device being configured to conduct the leak diagnosis based on atmospheric pressure and a pressure change inside the portion of the fuel vapor treatment system while the portion of the fuel vapor treatment system is closed off, the failure diagnosis control device being further configured to cancel a leak diagnosis result obtained by the leak diagnosis when a predetermined condition for canceling the leak diagnosis result is determined, the failure diagnosis control device being further configured to determine that the predetermined condition for canceling the leak diagnosis result is satisfied when a difference between the atmospheric pressure and the pressure inside the portion of the fuel vapor treatment system undergoing the leak diagnosis is greater than or equal to an opening pressure of a relief valve provided in a filler cap of the fuel tank.

10. The fuel vapor treatment system as recited in claim 9, wherein the failure diagnosis control device is further configured to use the atmospheric pressure detected after conducting the leak diagnosis when making a determination that the predetermined condition for canceling the leak diagnosis result is satisfied.

11. The fuel vapor treatment system as recited in claim 10, wherein the failure diagnosis control device is further configured to use the atmospheric pressure detected after conducting the leak diagnosis by the absolute pressure sensor detecting an output value when the drain cut valve has been open for a prescribed amount of time after conducting the leak diagnosis.

12. A fuel vapor treatment system comprising:

a fuel tank;

a canister fluidly coupled to the fuel tank and configured to adsorb fuel vapor evaporated from the fuel tank;

a purge valve disposed to open and close piping that fluidly couples the canister to an intake passage of an internal combustion engine into which fuel vapor flows from the canister;

a drain cut valve operatively coupled to the canister to open and close an atmospheric release port of the canister;

an absolute pressure sensor configured and arranged to detect absolute pressure inside the fuel vapor treatment system and measure atmospheric pressure based on an open-closed statuses of the drain cut valve and the purge valve; and a failure diagnosis control device configured and arranged to close off a portion of the fuel vapor treatment system between the fuel tank and the purge valve and conduct a leak diagnosis when a permission condition is met, the leak diagnosis control device being configured to conduct the failure diagnosis based on atmospheric pressure and a pressure change inside the portion of the fuel vapor treatment system while the portion of the fuel vapor treatment system is closed off the failure diagnosis control device being further configured to cancel a leak diagnosis result obtained by the leak diagnosis when a predetermined condition for canceling the leak diagnosis result is determined, the failure diagnosis control device being further configured to determine that the predetermined condition for canceling the leak diagnosis result is satisfied when a chance in atmospheric pressure exceeds a prescribed value, the failure diagnosis control device being further configured to determine that the predetermined condition for canceling the leak diagnosis result is satisfied when a difference between the atmospheric pressure and the pressure inside the portion of the fuel vapor treatment system undergoing the leak diagnosis is greater than or equal to an opening pressure of a relief valve provided in a filler cap of the fuel tank.

13. The fuel vapor treatment system as recited in claim 12, wherein the failure diagnosis control device is further configured to use the atmospheric pressure detected after conducting the leak diagnosis when making a determination that the predetermined condition for canceling the leak diagnosis result is satisfied.

14. The fuel vapor treatment system as recited in claim 13, wherein the failure diagnosis control device is further configured to use the atmospheric pressure detected after conducting the leak diagnosis by the absolute pressure sensor detecting an output value when the drain cut valve has been open for a prescribed amount of time after conducting the leak diagnosis.

15. A fuel vapor treatment system comprising:

storage means for containing fuel;

canister means for adsorbing fuel vapor evaporated from the storage means;

piping means for fluidly coupling the storage means to the canister means and an intake passage of an internal combustion engine;

purge valve means for regulating fuel vapor flows from the canister means to the intake passage;

drain cut valve means for controlling air flow into the canister;

absolute pressure sensor means for detecting absolute pressure inside the fuel vapor treatment system and for measuring atmospheric pressure based on an open-closed statuses of the drain cut valve means and the purge valve means; and a failure diagnosis control means for closing off a portion of the fuel vapor treatment system between the storage means and the purge valve means, for conducting a leak diagnosis based on atmospheric pressure and a change in the absolute pressure inside the portion of the fuel vapor treatment system when the portion of the fuel vapor treatment system is closed off and a permission condition is met, for canceling a leak diagnosis result obtained by the leak diagnosis when a predetermined condition for canceling the leak diagnosis result is determined, for detecting a change in atmospheric pressure by comparing a first output value detected by the absolute pressure sensor before conducting the leak diagnosis and a second output value detected by the absolute pressure sensor after conducting the leak diagnosis, and for determining that the predetermined condition for canceling the leak diagnosis result is satisfied when the change in atmospheric pressure exceeds a prescribed value.

16. A method for diagnosing a fuel vapor treatment system, comprising:

measuring absolute pressure inside the fuel vapor treatment system having a fuel tank fluidly connected to an intake passage of an internal combustion engine with a canister that is configured to adsorb fuel vapor evaporated from said fuel tank;

determining an operational state of a drain cut valve operatively coupled to the canister of the fuel vapor treatment system;

determining an operational state of a purge valve operatively coupled to the canister of the fuel vapor treatment system;

using a single absolute pressure sensor to detect absolute pressure inside the fuel vapor treatment system and measure atmospheric pressure based on the operational states of the drain cut valve and the purge valve;

conducting a failure diagnosis on the fuel vapor treatment system based on atmospheric pressure and a change in the absolute pressure inside the portion of the fuel vapor treatment system when the portion of the fuel vapor treatment system is closed off by the drain cut valve and the purge valve and a permission condition is met;

canceling a leak diagnosis result obtained by the leak diagnosis when a predetermined condition for canceling the leak diagnosis result is determined;

detecting a change in atmospheric pressure by comparing a first output value detected by the absolute pressure sensor before conducting the leak diagnosis and a second output value detected by the absolute pressure sensor after conducting the leak diagnosis; and determining that the predetermined condition for canceling the leak diagnosis result is satisfied when the change in atmospheric pressure exceeds a prescribed value.

* * * * *